(12) United States Patent
Beall

(10) Patent No.: US 11,597,422 B1
(45) Date of Patent: Mar. 7, 2023

(54) TOWABLE FLEXIBLE SHEET MOVER

(71) Applicant: Gary Beall, St. Marys, GA (US)

(72) Inventor: Gary Beall, St. Marys, GA (US)

( * ) Notice: Subject to any disclaimer, the term of this patent is extended or adjusted under 35 U.S.C. 154(b) by 0 days.

(21) Appl. No.: 18/048,260

(22) Filed: Oct. 20, 2022

(51) Int. Cl.
*B62B 15/00* (2020.01)

(52) U.S. Cl.
CPC ........ *B62B 15/007* (2013.01); *B62B 2501/04* (2013.01)

(58) Field of Classification Search
CPC ..... B62B 15/007; B62B 15/008; B62B 17/06; B62B 17/061; B62B 5/068
See application file for complete search history.

(56) References Cited

U.S. PATENT DOCUMENTS

| | | | | |
|---|---|---|---|---|
| 2,974,971 A * | 3/1961 | Buck | ...................... | A01G 20/40 383/127 |
| 3,140,878 A | 7/1964 | Davis | | |
| 4,046,393 A | 9/1977 | Vadnais | | |
| 5,325,971 A * | 7/1994 | Moran | ...................... | B65F 1/14 209/614 |
| 5,529,321 A | 6/1996 | Thompson | | |
| 6,276,698 B1 | 8/2001 | Calandra | | |
| 6,651,414 B1 | 11/2003 | Sowers | | |
| 7,547,024 B1 | 6/2009 | Dell | | |
| 9,232,699 B1 | 1/2016 | Tosto | | |
| 9,487,226 B2 * | 11/2016 | Coates | ................... | B62B 17/061 |
| 9,550,512 B2 | 1/2017 | Schioler | | |
| 10,450,710 B2 | 10/2019 | Moore | | |
| 10,479,154 B2 * | 11/2019 | Butler | ................... | B60F 3/0092 |
| 2003/0221989 A1 * | 12/2003 | DeSanti | ................. | A01G 20/43 206/449 |
| 2012/0074679 A1 | 3/2012 | Kinsey | | |
| 2013/0181416 A1 | 7/2013 | Ross | | |
| 2022/0354106 A1 * | 11/2022 | Hayder | ................... | B62B 13/16 |

* cited by examiner

*Primary Examiner* — John D Walters
(74) *Attorney, Agent, or Firm* — Mark Young, PA

(57) ABSTRACT

A towable mover includes a flexible mat and a hollow tow bar substantially contained in a sleeve at the leading edge of the mat. A tow rope is coupled to each end of the tow bar for towing. Couplings include a plug assembly securely received within the interior space at an end of the tow bar and a rope coupling assembly attached to the plug assembly. The plug assembly includes a resilient elastomeric cylindrical plug, the diameter of which swells when the ends are squeezed together by tightening a bolt. The rope coupling assembly is external to the tow bar and external to the sleeve. The sleeve is disposed between portions of the mat that may freely fold to allow passage through narrow spaces.

20 Claims, 10 Drawing Sheets

TOWABLE FLEXIBLE SHEET MOVER

FIELD OF THE INVENTION

This invention relates generally to a towing apparatus, and, more particularly, to flexible sheet with a coupled tow bar and tow rope for moving objects and material on the flexible sheet.

BACKGROUND OF THE INVENTION

Landscaping, gardening, tree trimming and pruning, hunting, fishing and other outdoor tasks frequently require removal of debris, materials, catch and quarry. Trailers, wheel barrows, tractors with front loaders, crossover utility vehicles (XUVs), pickup trucks, trash cans and other containers are useful for such tasks. However, even if such vehicles and equipment are available, they have limits. Items must be lifted and carried into them. Additionally, wheel barrows and similar carts can be unstable and difficult to move. The same is true for trash cans and other containers.

In the past, various sleds have been devised to facilitate removal. The sleds include a sled body, such as a tarpaulin, and means for pulling the sled. For example, U.S. Pat. No. 3,140,878 describes a sled comprised of flexible ribbed polyethylene and a rope handle. U.S. Pat. No. 4,046,393 describes a flexible polyethylene sled with a transverse bar at the leading edge. In one embodiment, lines extend from the bar, for towing. U.S. Pat. No. 5,529,321 describes a reinforce tarp with grommets that attaches to a draft bar. The draft bar includes eyebolts. A harness made of lines connects the bar to a tractor. U.S. Pat. No. 6,276,698 describes a game tote (similar to a stretcher) for hauling hunted and killed animals (e.g., deer). The tote is a rectangular flexible sheet (e.g., canvas or other fabric) with sleeves formed along each edge. Each sleeve receives a pole assembly 145. The pole assemblies form a peripheral frame. A pivoting tow bar extends from the bar at the leading edge. U.S. Pat. No. 6,565,101 describes a hauling tarp, with a line running through grommets along each side and the back. When towed by the line, the tarp bunches up around the towed material (e.g., leaves). U.S. Pat. No. 6,651,414 describes a flexible sheet attached at the discharge collector of a riding mower. Ejected lawn debris collects on the sheet which is pulled around by the mower. U.S. Pat. No. 7,547,024 describes a game tote with a flexible sheet with grommets along each side for securing a storage tube and for securing game. The storage tube stores the rolled-up sheet when not in use. Tethers passing through grommets near the leading edge are used to form a pocket that will contain the tube, when the sheet is used for hauling. The tube provides a rounded leading edge, like that of a toboggan. U.S. Pat. No. 9,232,699 describes a towable lawn tarp that includes a waist belt, with grommets and clips for connecting to a line attached to the tarp. U.S. Pat. No. 9,550,512 describes a teardrop shaped towing mat with stiffening tubes on the converging sides. The trailing edge bunches up and folds forward as a load is pulled. U.S. patent Ser. No. 10/450,710 describes a large towed polymer sheet for catching snow from a snowblower, to protect the turf of a sports stadium. US Patent Application Publication No. 20120074679 describes a tarp with a rod or pipe attached to the leading edge and a line extending from the pipe to a handle. US Patent Application Publication No. 20130181416 describes a tarp with a hauling rig. The leading edge of the tarp is hemmed for reinforcement and provided with grommets. The rig includes a bar with a spring and clip to connect to each grommet in the leading edge of the tarp. The bar may be coupled to a handle for manual use or a tow coupling of a vehicle.

While useful for their intended purpose, these prior devices have shortcomings. Those that include a towing bar have a bar that extends substantially across entire leading edge. This configuration limits the size the of passage (e.g., gate opening) through which the device can be pulled. Those that include rope attached to a bar have rope attachment points between the ends of the bar. The narrow distance between the attachment points is conducive to instability. Additionally, hardware connecting a towing bar to a towing rope typically pierces the bar, compromises the strength of the bar, and protrudes from the bar in a manner that creates risk of snagging, tearing and injury.

A sled with a flexible base that can be rolled and folded and bent to fit through narrow openings is needed. A sled with a tow bar with attachment hardware mounted at and substantially concealed within the ends of the bar is also needed. A sled with rope attachment hardware that does not pierce the bar, compromise the strength of the bar, or protrude from the bar in a manner that creates risk of snagging, tearing and injury is also needed.

The invention is directed to overcoming one or more of the problems and solving one or more of the needs as set forth above.

SUMMARY OF THE INVENTION

To solve one or more of the problems set forth above, in an exemplary implementation of the invention, a towable mover according to principles of the invention includes a mat. The mat is flexible and has a leading edge and a trailing edge. The leading edge includes a sleeve. A tow bar is substantially contained in the sleeve. The tow bar is hollow, includes an interior space and includes a first end and an opposite second end. A tow rope is provided for towing. Couplings, i.e., first and second couplings are attached to the first end and second end, respectively, of the tow bar. Each coupling includes a plug assembly securely received within the interior space at an end of the tow bar. Each coupling also includes a rope coupling assembly attached to the plug assembly. The rope coupling assembly is external to the tow bar and external to the sleeve. Each rope coupling assembly includes a channel (e.g., groove) configured to receive a portion of the tow rope.

The sleeve at the leading edge may have a length that is not greater than about 36 inches, or a length that is not greater than about ½ the distance between the side edges of the mat, or a length that is less than the distance between the side edges of the mat. By way of example and not limitation, the distance between the side edges may be greater than 36 inches, such as about 72 inches. The mat may be symmetrical about an axis that bisects the trailing and leading edges. The sleeve extends along a portion (not the entirety) of the leading edge. The sleeve is centered where the axis bisects the leading edge. The sleeve is flanked by first and second portions of the leading edge of the mat, with the sleeve disposed between the first and second portions. The lengths of the first ad second portions may be substantially equal. Precise equality is within the scope of the invention, but is not required.

The plug assembly includes a resilient and cylindrical plug having an inboard end, an outboard end, an outer diameter, a central channel extending through the plug from the inboard end to the outboard end, and a distance between the inboard end and the outboard end. The plug assembly also includes a washer against (abutting) the inboard end of the plug assembly. The washer may be a flat washer or an annular flange of a tee nut. In the case of a tee nut, the internally threaded barrel of the tee nut is received in the central channel of the plug, and the prongs of the flange are embedded into the inboard end of the plug.

Each of the first and second rope coupling assemblies may include a rope thimble disposed between a pair of flat washers. The rope thimble may have a bend section with a maximum width. Each washer of the pair of flat washers may have an outer diameter equal to or greater than the maximum width of the bend section.

A bolt includes a shank. At least a portion of the shank is threaded. The shank of the bolt extends through the rope thimble disposed between a pair of flat washers, and extends into the internally threaded barrel of the tee nut, within the channel of the plug. Tightening the bolt squeezes (i.e., compresses) the plug between the washer or tee nut and the rope coupling assembly, which causes the outer diameter of the plug to increase. Such increase in diameter increases frictional retention force within the interior of the hollow end of the tow bar. Such friction prevents or resists withdrawal of the plug. Notably, the structure of the tow bar is not modified, pierced or otherwise damaged or compromised by the plug or other components of the coupling.

In an alternative embodiment, each of the first and second rope coupling assemblies may include a pulley or sheave. The pulley includes a hub, a hub channel through a center of the hub, and a peripheral surface with a groove configured to receive a portion of the wire rope.

The tow rope may be a wire rope. The wire rope includes a first end and a second end opposite the first end. A first loop is formed at the first end. A second loop is formed at the second end. The first loop substantially surrounds the channel of the first rope coupling assembly. The second loop substantially surrounds the channel of the second rope coupling assembly. A medial loop may also be formed between the first loop and the second loop. Each loop may be formed with a wire rope clamp fastening two portions of wire rope.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
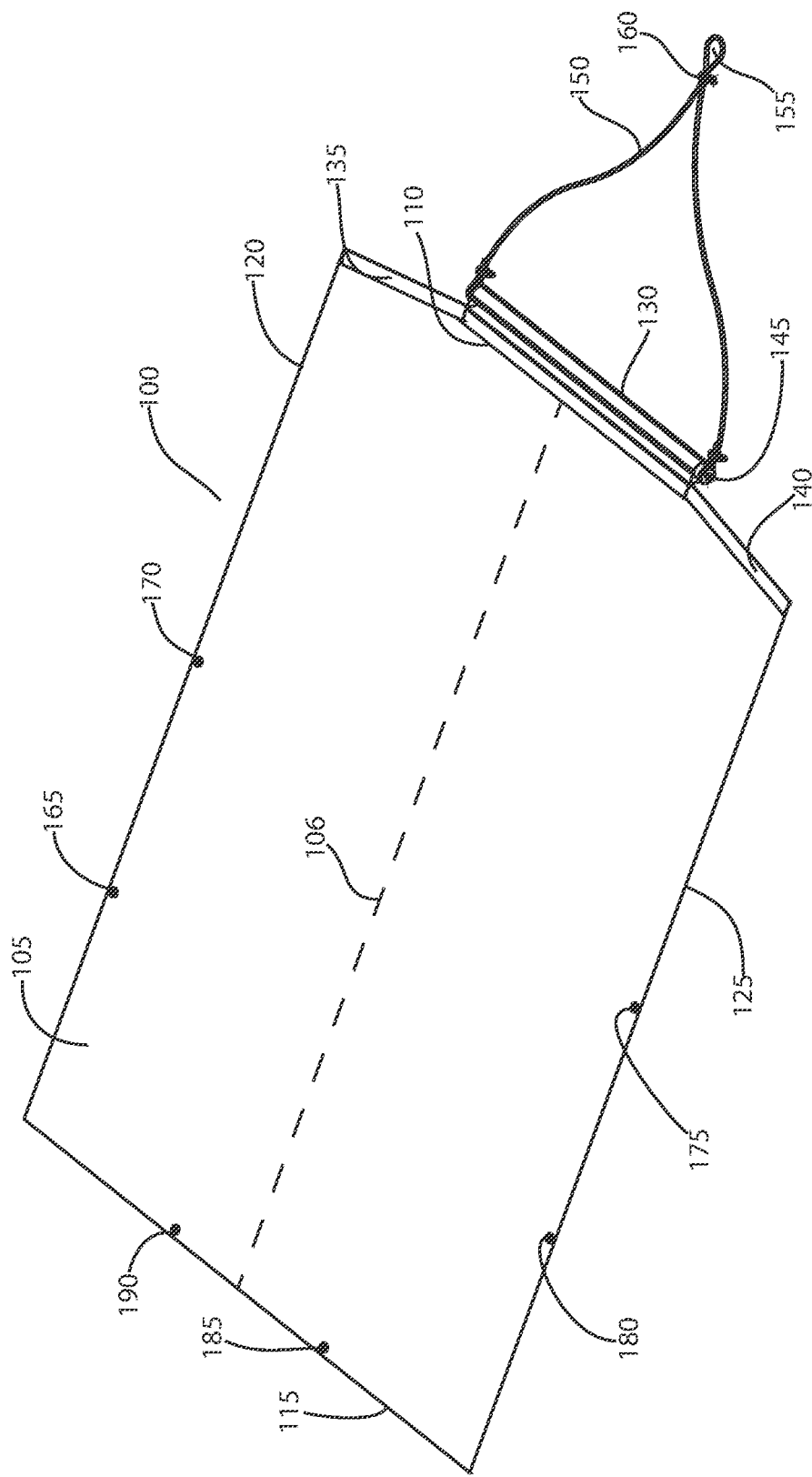
FIG. 1 is a top perspective view of an exemplary towable flexible sheet mover according to principles of the invention.
Figure 2:
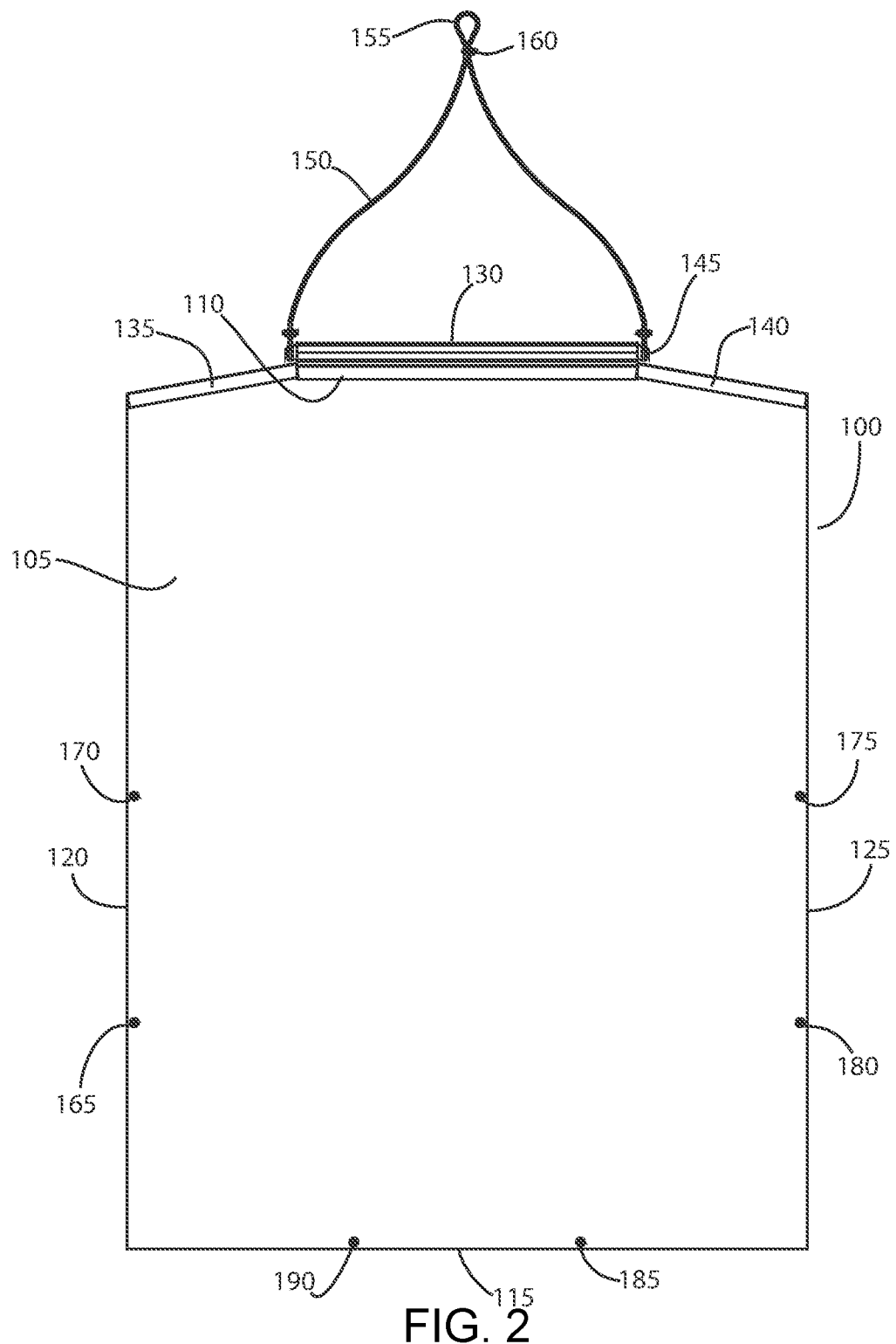
FIG. 2 is a plan view of an exemplary towable flexible sheet mover according to principles of the invention.

With reference to FIGS. 1 and 2, a towable flexible sheet mover 100 according to principles of the invention includes a flexible mat, a plurality of grommets, a tow bar assembly 145 and a towing rope. The mat provides a surface on which material and objects to be towed may be placed. The grommets provide apertures through which tie down straps may be attached to secure items and material to the mat. The tow bar assembly 145 transfers towing force to the mat. The towing rope transfers towing force to the tow bar. In an exemplary embodiment, the tow bar assembly 145 is centered along the leading edge of the mat, but does not extend the entire length of the leading edge. Portions of the leading edge without the towing bar may fold to facilitate passage through narrow openings, such as through gates. The tow bar assembly 145 couples ends of the towing rope to the tow bar with attachment hardware mounted at and concealed within the ends of the bar, and without any bolts, similar fasteners or other hardware penetrating and extending from the tow bar. This configuration avoids hardware extending from the tow bar in a manner that poses a snagging, tearing and injury risk.

The mat 105 is a strong flexible tear resistant sheet of material. As a nonlimiting example, the mat 105 may comprise a high strength polypropylene, or a woven coated reinforced polyethylene sheet of at least 5 mils in thickness. Alternatively, the mat 105 may be comprised of any commercially available high strength tarpaulin materials. Such material may be mold and mildew resistant. In an exemplary embodiment, the mat 105 may support materials weighing many hundreds of pounds and maintain structural integrity when towing such materials by sliding (i.e., pulling) the mat 105 on terrain.

The mat 105 is sized to provide a sufficient surface area to haul an appreciable volume of objects or material. In one exemplary embodiment the width of the mat 105, i.e., the distance between the sides 120, 125 is approximately 72 inches, and the length of each side 120, 125 is about 90 to 91 inches, to provide a surface area of approximately at least 45 square feet. While such dimensions provide a surface area that is sufficient for many hauling tasks, the invention is not limited to a particular size mat. Rather mats having other lengths, widths and surface areas may be used within the spirit and scope of the invention.

The mat 105 includes first and second side edges 120, 125, a trailing edge 115 and a leading edge 110. The leading edge 110 is coupled to the tow bar assembly 145 and tow rope 150. The trailing edge 115 is opposite the leading edge 110.

All edges 110, 115, 120, 125 of the mat 105 may be protected to prevent damage, such as fraying and raveling. By way of example and not limitation each edge 110, 115, 120, 125 may include a hem. The hem may be made by folding a free edge under and stitching or bonding it to adjacent material of the mat 105.

The mover 100 includes fastening devices. By way of example, a plurality of grommets 165, 170, 175, 180, 185 and 190 are provided. Each grommet is a reinforced eyelet through which a fastener may be passed. The fastener may be a length of rope, shock cord, or other tether, or a hook or similar devices attached to the end of a tether. Towed objects and materials may be tied down using a tether and the grommets 165, 170, 175, 180, 185 and 190. Additionally, tether may be pulled tightly through certain grommets 165, 170, 175, 180, 185 and 190 to deform the mat 105 into a shape that cradles or conforms to the towed objects and materials.

A tow bar assembly 145 is coupled to the leading edge. A portion of the leading edge is folded over to form a sleeve 130 that provides an inner diameter that is at least slightly greater than the outer diameter of the tow bar assembly 145. Thus, the tow bar assembly may be received in the sleeve 130. The length of the sleeve 130 is substantially equal to (slightly less than) the length of the tow bar assembly 145. The ends of the tow bar assembly 145 extend from the sleeve 130.

The length of the sleeve 130 is less than the width of the mat 105, i.e., the distance between the sides 120, 125. By way of example and not limitation, the sleeve 130 may be about 36 inches in length. The sleeve 130 is centered at the leading edge 110 along a median axis 106, which is also a longitudinal axis and an axis of symmetry. Equal length portions are provided on each side of the sleeve at the leading edge. For example, hemmed portions 135 and 140 are provided on opposite sides of the sleeve 130 at the leading edge 110. These hemmed portions 135, 140 may fold independently of the sleeve 130. Thus, the hemmed portions 135, 140 may fold to facilitate passage of the mover 100 through a narrow opening, such as a doorway or gate.

A tow rope 150 extends from the tow bar assembly 145. The middle of the tow rope 150 is formed (cinched) into a loop 155 by a wire rope clamp 160. The loop 155 may be sized by loosening the clamp 160, sliding it towards or away from the tow bar assembly 145 (i.e., depending upon whether the size is to be increased or decreased), and then re-tightening the clamp 160. The loop 155 may be sized for engagement by a towing hook, hitch ball, a chain or other apparatus.

As used herein, rope broadly means any suitable tether. Rope is not limited to any specific materials (e.g., not limited to hemp or other fiber) or to any specific structure (e.g., not limited to twisted or braided). As used herein rope includes wire rope (e.g., cable), fiber rope, string, cord, and chain. Wire rope is preferred for the tow rope 150.

Figure 3:
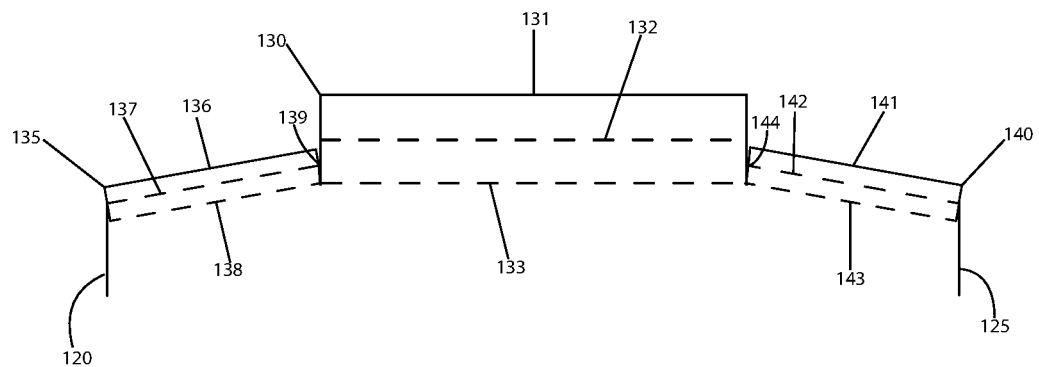
FIG. 3 is a schematic illustrating an exemplary leading edge of a towable flexible sheet mover according to principles of the invention.

In an exemplary embodiment, the leading edge includes three sections. The sleeve 130 is a center section. Hemmed portions 135 and 140 are right and left sections, respectively. With reference to FIG. 3, the center section 130 may be formed by folding at fold line 132 and attaching material at or about the free end 131 to the material at or about attachment line 133. The resulting hem should be sized to form a sleeve 130 with an inner diameter that is at least is great (and preferably slightly greater than) the outer diameter of the tow bar assembly 145. This configuration allows the sleeve 130 to receive the tow bar assembly without tearing or damaging the sleeve 130. Hemmed portion 135 is formed by folding at fold line 137 and attaching material at or about the free end 136 to the material at or about attachment line 138. A slit or gap 139 separates the hemmed portion 135 from the sleeve 130 to allow the hemmed portion 135 to fold independent of the sleeve 130, and independent of the other hemmed portion 140. Hemmed portion 140 is formed by folding at fold line 142 and attaching material at or about the free end 141 to the material at or about attachment line 143. A slit or gap 144 separates the hemmed portion 140 from the sleeve 130 to allow the hemmed portion 140 to fold independent of the sleeve 130, and independent of the other hemmed portion 135.

Figure 4:
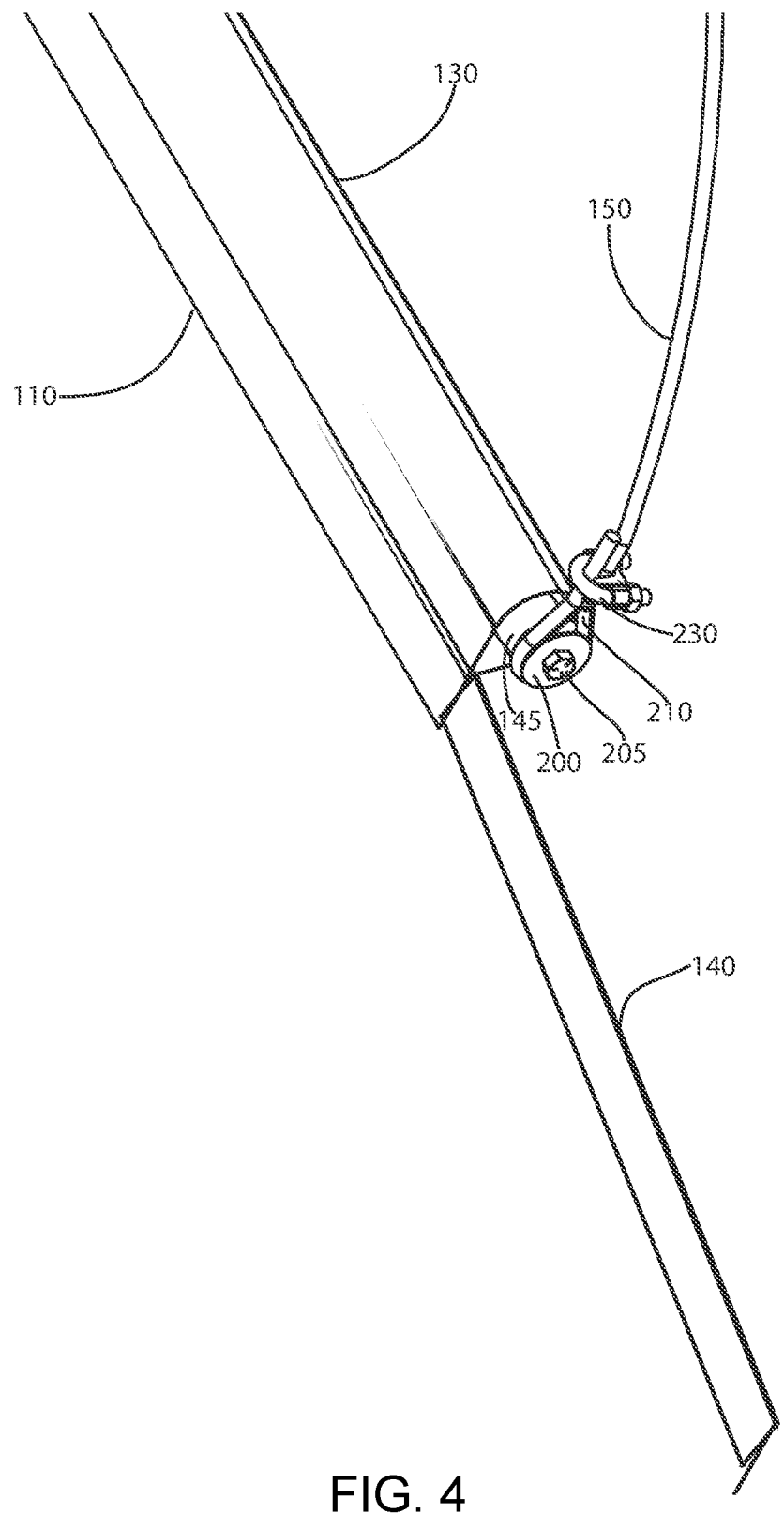
FIG. 4 is a perspective view of a portion of an exemplary leading edge and tow bar assembly of a towable flexible sheet mover according to principles of the invention.
Figure 5:
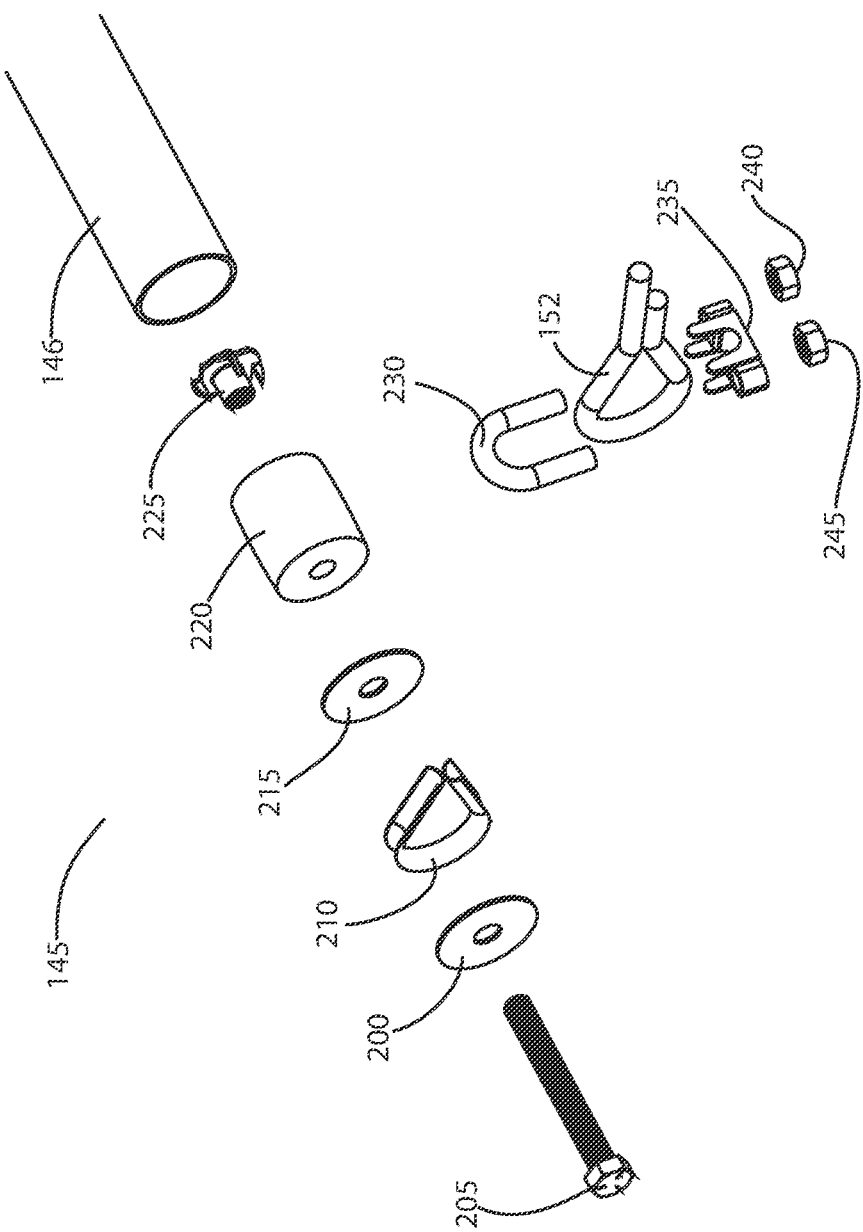
FIG. 5 is an exploded perspective view of an exemplary coupling assembly of a towable flexible sheet mover according to principles of the invention.

FIGS. 4 and 5 illustrate components of the tow bar assembly 145. The assembly 145 includes a bar 146. The bar 146 is a hollow tube. In an exemplary embodiment, the bar 146 is a hollow tubular steel galvanized pipe with an outer diameter of at least one inch and preferably 1.25 inch. The wall thickness of the pipe is sufficient for structural integrity during use. A pipe with a wall thickness of at least $1/16$ inch and more preferably $1/8$ inch may be used.

Figure 6:
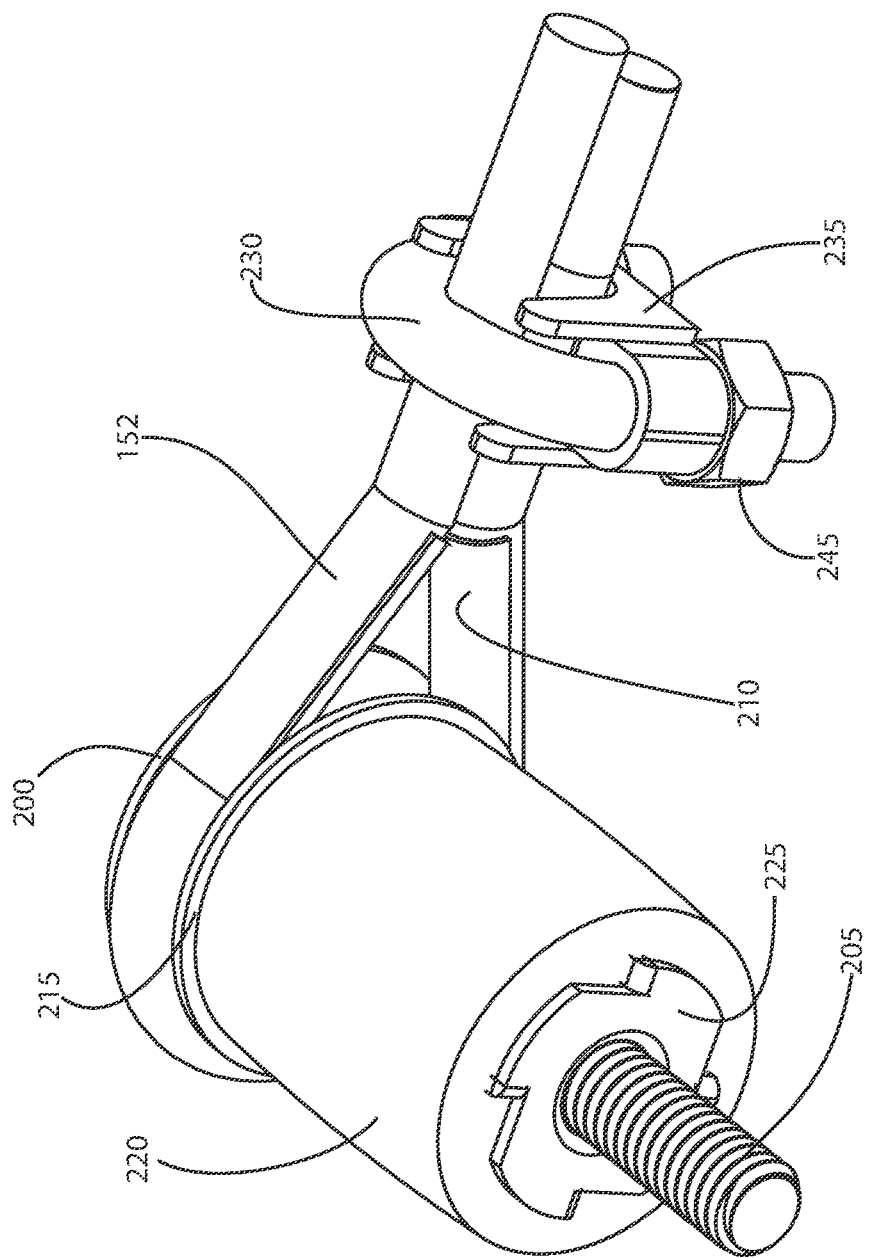
FIG. 6 is a first assembled perspective view of an exemplary coupling assembly of a towable flexible sheet mover according to principles of the invention.
Figure 8:
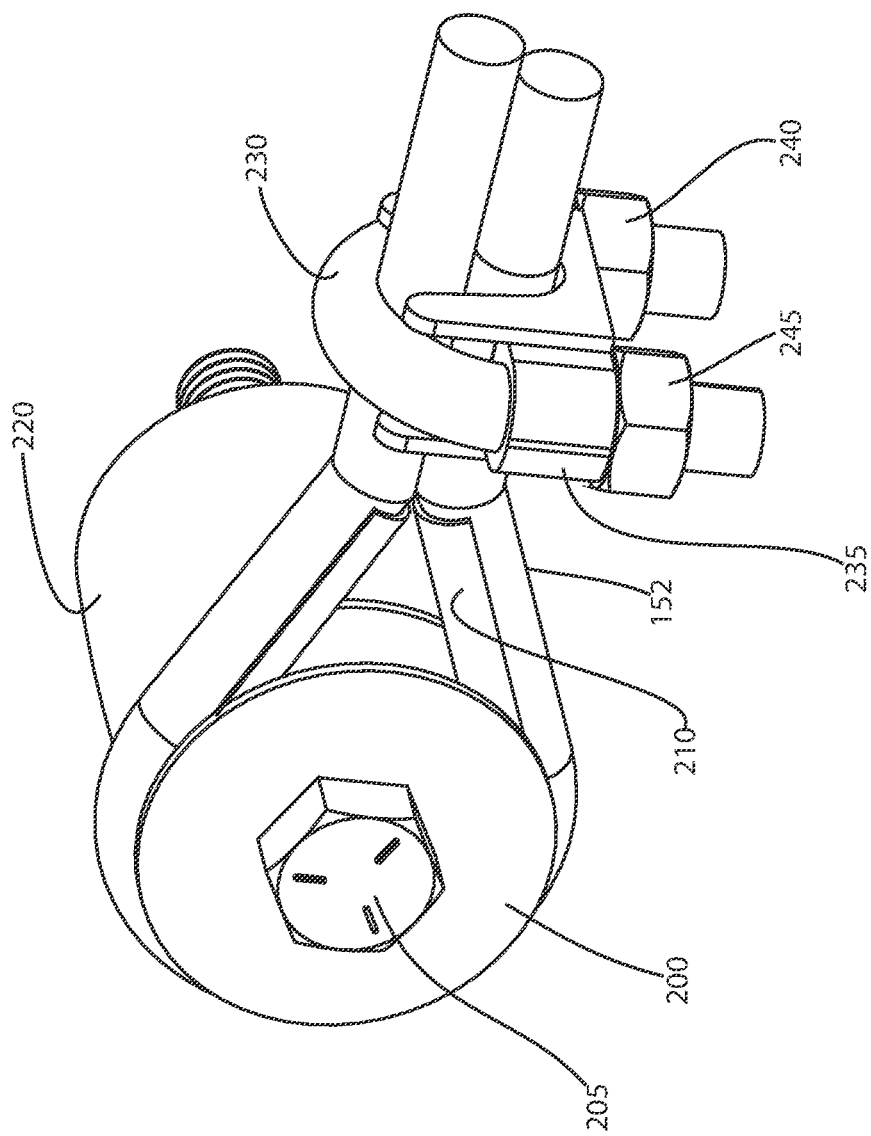
FIG. 8 is a second assembled perspective view of an exemplary coupling assembly of a towable flexible sheet mover according to principles of the invention.

A coupling is attached at each end of the pipe. FIGS. 5, 6 and 8 illustrate one such coupling. The coupling is an assembly comprised of components 200-225. The components provide a smooth channel for engaging a loop of the tow rope 150. The components also provide an adjustable geometry structure that can be tightened to securely engage the interior surface of the pipe 146. The coupling for the opposite side of the pipe is identical to the coupling shown in FIGS. 5, 6 and 8. A wire rope thimble 210 is disposed (sandwiched) between a pair of flat washers 200, 215. The thimble provides a smooth channel for engaging a loop of the tow rope 150. Each flat washer 200, 215 has a diameter that is at least equal to and preferably greater than the maximum diameter of the bend of the wire rope thimble 210. An elastomeric plug or bushing 220 (e.g., an EPDM bushing) is disposed between the inboard flat washer 215 and a tee nut 225. In an undeformed state, the elastomeric bushing 220 is generally cylindrical in shape, with a central passage having a diameter that sized to receive the threaded shank of bolt 205 (e.g. a hex head bolt). The threaded shank of the bolt 205 is long enough to extend through the outboard washer 200, the bend of the thimble 210, the inboard washer 215, the central channel of the bushing 220, and into a threaded channel of the tee nut 225. The assembled coupler may be slid into the open end of the pipe 146, as shown in FIG. 4. Tightening the nut 205, decreases the length of the elastomeric bushing 220, which causes the outer diameter of the elastomeric bushing 220 to swell or expand. Such expansion increases pressure exerted by the bushing 220 against the engaged interior surface of the end of the pipe 146. Thus, the geometry change and attendant increased pressure frictionally secure the bushing 220 against the engaged interior surface of the end of the pipe 146 and thereby resist withdrawal of the coupling from the open end of the pipe 146.

In this manner, the coupling is joined to the pipe 146 without any hardware piercing the pipe, compromising the strength of the pipe, or protruding from the pipe in a manner that creates risk of snagging, tearing and injury. The pipe 146 is not damaged in any way by the coupling. The coupling may be removed by loosening the bolt 205. Such removal will not damage the pipe 146. No machining, drilling or welding is required. The pipe 146 and any original coating (e.g., a rust-resistant zinc coating of a galvanized steel pipe) remain intact. Substantially all interior space of the pipe 146 is sealed off by the coupling, particularly by the elastomeric bushing 220.

Figure 11:
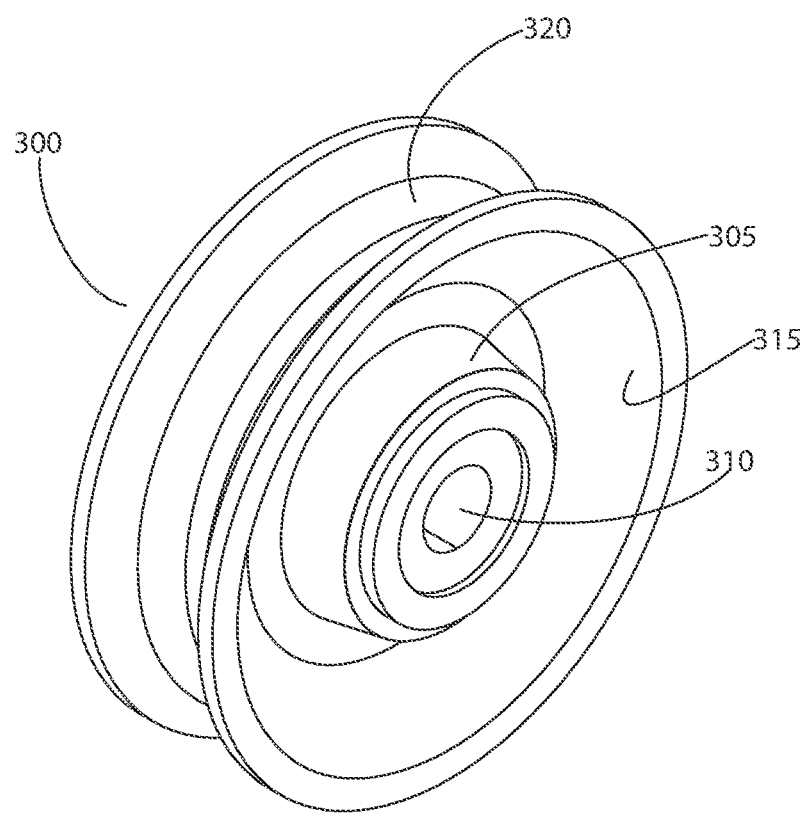
FIG. 11 is a perspective view of an exemplary optional pulley for a coupling assembly of a towable flexible sheet mover according to principles of the invention.

In the exemplary embodiment, the portion of the coupling that provides a smooth channel for engaging a loop of the tow rope 150 is comprised of the wire rope thimble 210 disposed (sandwiched) between the pair of flat washers 200, 215. In lieu thereof, a pulley or sheave for wire rope may be provided. The pulley or sheave may include a U-groove sized to cradle an engaged portion of the wire rope 150. The pulley may lack or include a bearing. A nonlimiting example of a pulley without a bearing is illustrated in FIG. 11. The exemplary pulley 300 includes a fixed hub 305 with a central channel 310, a disc-shaped body 315 and a peripheral groove 320 shaped and sized to receive and cradle an engaged portion of a wire rope 150. In today's market, the pulley or sheave is a more costly option than the thimble 210 disposed (sandwiched) between the pair of flat washers 200, 215.

A portion 152 of the wire rope 150 engages each thimble 210. The engaging portion 152 is a loop-shaped portion that is clamped or cinched with a wire rope clamp. One nonlimiting example of a suitable clamp includes a saddle 235, a U-bolt 230, the free ends of which extend through holes in the saddle 235, and a pair of nuts 240, 245 sized to threadedly engage each threaded free end of the u-bolt 230 that extends through the saddle 235. Tightening the nuts 240, 245 reduces the space between the saddle 235 and the bent portion of the u-bolt 230. The long (live) portion of the turnback of the wire rope 150 and short (dead) end are captured (clamped) between the saddle 235 and the bent portion of the u-bolt 230. Other suitable clamps include compression sleeves and crimp type rope clamps, which may be used within the spirit and scope of the invention.

Figure 7:
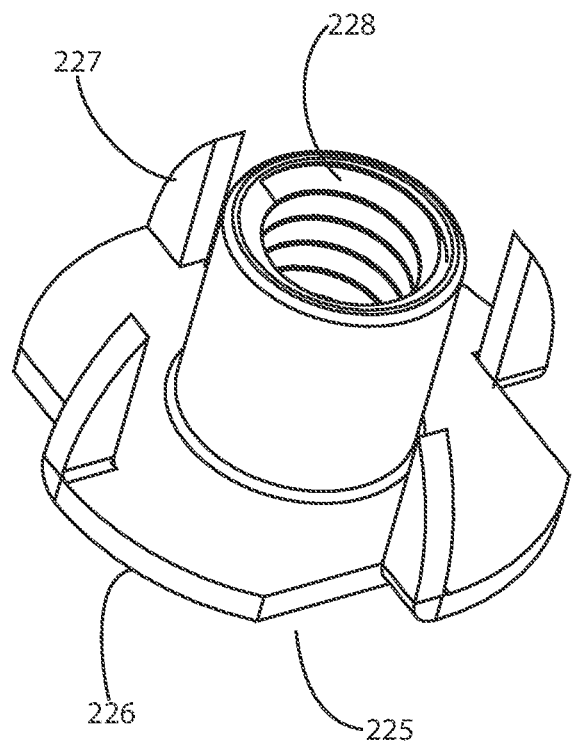
FIG. 7 is a perspective view of an exemplary tee nut for a coupling assembly of a towable flexible sheet mover according to principles of the invention.

An exemplary tee nut 225 is shown in FIG. 7. The tee nut 225 includes an internally threaded barrel 228. The barrel 228 is sized and threaded to threadedly engage the shank of the nut 205. An annular flange 226 is attached to one end of the barrel 228. Cuts are made along portions of chords of the annular flange 226. The cut portions are bent perpendicular to the flange 226 to form prongs 227. The barrel 228 extends into the central passage of the elastomeric bushing 220. As the threaded shank of bolt 205 is threaded into the barrel 228, the flange 226 is drawn tight against the bushing 220 and the prongs are driven into the bushing 220. The embedded prongs 227 prevent rotation of tee nut 225 relative to the bushing 220.

Figure 9:
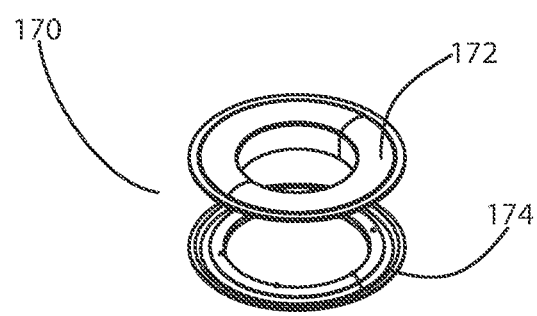
FIG. 9 is an exploded perspective view of an exemplary fabric grommet of a towable flexible sheet mover according to principles of the invention.
Figure 10:
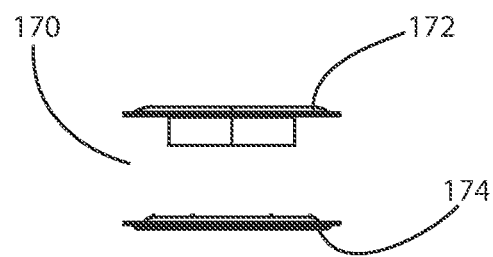
FIG. 10 is an exploded profile view of an exemplary fabric grommet of a towable flexible sheet mover according to principles of the invention.

FIGS. 9 and 10 illustrate an exemplary fabric grommet 170 for use with the mat 105. The grommet 170 is a two-part malleable sheet metal assembly comprising a first annular washer-like part 174 engageable at one surface of the mat 105, about a hole established therein, and a second annular washer-like part 172 engageable at the opposite surface of the mat 105 and having a tubular or sleeve-like neck which extends through the opening in the mat 105, through the first annular part 174 and which is formed radially outwardly to overlie the first part 174 and to hold the two parts in tight, clamped engagement with the mat 105.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A towable mover comprising
   a mat, the mat being flexible and having a leading edge and a trailing edge, the leading edge including a sleeve; and
   a tow bar substantially contained in the sleeve, the tow bar being hollow, including an interior space and including a first end and an opposite second end; and
   a tow rope; and
   a first coupling attached to the first end of the tow bar, the first coupling including a first plug assembly, the first plug assembly being securely received within the interior space at the first end, and the first coupling further including a first rope coupling assembly, the first rope coupling assembly being attached to the first plug assembly, external to the tow bar, and external to the sleeve, and the first rope coupling assembly including a channel configured to receive a portion of the tow rope; and
   a second coupling attached to the second end of the tow bar, the second coupling including a second plug assembly, the second plug assembly being securely received within the interior space at the second end, and the second coupling further including a second rope coupling assembly, the second rope coupling assembly being attached to the second plug assembly, external to the tow bar, and external to the sleeve, and the second rope coupling assembly including a channel configured to receive a portion of the tow rope.

2. The towable mover according to claim 1, wherein the sleeve has a length that is not greater than about 36 inches.

3. The towable mover according to claim 1, wherein the mat includes a first side edge and a second side edge opposite the first side edge, and the sleeve has a length that is not greater than about ½ the distance between the first side edge and the second side edge.

4. The towable mover according to claim 1, wherein the mat includes a first side edge and a second side edge opposite the first side edge, and the sleeve has a length that is not greater than about 36 inches, and a distance between the first side edge and the second side edge is greater than 36 inches.

5. The towable mover according to claim 1, the mat including a first side edge and a second side edge opposite the first side edge, and the sleeve having a length that is not greater than about 36 inches, and a distance between the first side edge and the second side edge is about 72 inches.

6. The towable mover according to claim 1, wherein the mat is symmetrical about a first axis that bisects the trailing edge and the leading edge, and the sleeve extends along a portion of the leading edge, and the sleeve is centered where the first axis bisects the leading edge, and the leading edge includes a first portion and a second portion, the first portion of the leading edge being on a first side of the sleeve, and the second portion of the leading edge being on a second side of the sleeve, the second side of the sleeve being opposite the first side of the sleeve, and the sleeve being disposed between the first portion of the leading edge and the second portion of the leading edge.

7. The towable mover according to claim 6, wherein the first portion of the leading edge has a first length and the second portion of the leading edge has a second length and the first length substantially equals the second length.

8. The towable mover according to claim 1, the plug assembly comprising a plug, the plug being resilient and cylindrical, the plug having an inboard end, an outboard end, an outer diameter, a central channel extending through the plug from the inboard end to the outboard end, and a distance between the inboard end and the outboard end, the plug assembly further comprising a washer against the inboard end of the plug assembly.

9. The towable mover according to claim 8, the washer comprising an annular flange of a tee nut.

10. The towable mover according to claim 1, each of the first and second rope coupling assemblies comprising a rope thimble disposed between a pair of flat washers, the rope thimble having a bend section with a maximum width, and each washer of the pair of flat washers having an outer diameter greater than the maximum width of the bend section.

11. The towable mover according to claim 1, each of the first and second plug assemblies comprising a plug, the plug being resilient and cylindrical, the plug having an inboard end, an outboard end, an outer diameter, a central channel extending through the plug from the inboard end to the outboard end, and a distance between the inboard end and the outboard end, the plug assembly further comprising a tee nut, the tee nut including an internally threaded barrel received in the central channel of the plug, an annular flange abutting the inboard end of the plug, and a plurality of prongs extending from the annular flange into the inboard end of the plug.

12. The towable mover according to claim 11, each of the first and second rope coupling assemblies comprising a rope thimble disposed between a pair of flat washers, the rope thimble having a bend section with a maximum width, and each washer of the pair of flat washers having an outer diameter greater than the maximum width of the bend section.

13. The towable mover according to claim 12, each of the first and second couplings further comprising a bolt, the bolt including a shank and at least a portion of the shank being threaded, and the shank of the bolt extending through the rope thimble disposed between a pair of flat washers, and extending into the internally threaded barrel of the tee nut, and tightening the bolt causing the outer diameter of the plug to increase.

14. The towable mover according to claim 1, each of the first and second rope coupling assemblies comprising a pulley, the pulley including a hub, a hub channel through a center of the hub, and a peripheral surface with a groove configured to receive a portion of the wire rope.

15. The towable mover according to claim 14, each of the first and second plug assemblies comprising a plug, the plug being resilient and cylindrical, the plug having an inboard end, an outboard end, an outer diameter, a central channel extending through the plug from the inboard end to the outboard end, and a distance between the inboard end and the outboard end, the plug assembly further comprising a tee nut, the tee nut including an internally threaded barrel received in the central channel of the plug, an annular flange abutting the inboard end of the plug, and a plurality of prongs extending from the annular flange into the inboard end of the plug.

16. The towable mover according to claim 15, each of the first and second couplings further comprising a bolt, the bolt including a shank and at least a portion of the shank being threaded, and the shank of the bolt extending through the pulley, and extending into the internally threaded barrel of the tee nut, and tightening the bolt causing the outer diameter of the plug to increase.

17. The towable mover according to claim 1, the tow rope comprising a wire rope.

18. The towable mover according to claim 17, the wire rope including a first end and a second end opposite the first end, a first loop formed at the first end, a second loop formed at the second end, the first loop substantially surrounding the channel of the first rope coupling assembly, and the second loop substantially surrounding the channel of the second rope coupling assembly.

19. The towable mover according to claim 18, the wire rope further comprising a medial loop formed between the first loop and the second loop.

20. The towable mover according to claim 19, each loop of the first, second and medial loops being formed with a wire rope clamp fastening two portions of wire rope.

* * * * *